(12) United States Patent
Daneman et al.

(10) Patent No.: US 6,473,544 B1
(45) Date of Patent: Oct. 29, 2002

(54) OPTICAL SWITCH HAVING EQUALIZED BEAM SPREADING IN ALL CONNECTIONS

(75) Inventors: Michael Daneman, Pacifica; Behrang Behin; Meng-Hsiung Kiang, both of Berkeley; Kam Yin Lau, Danville, all of CA (US)

(73) Assignee: Onix Microsystems, Inc., Richmond, CA (US)

( * ) Notice: Subject to any disclaimer, the term of this patent is extended or adjusted under 35 U.S.C. 154(b) by 0 days.

(21) Appl. No.: 09/518,754

(22) Filed: Mar. 3, 2000

(51) Int. Cl.[7] ................................................ G02B 6/26
(52) U.S. Cl. ............................................ 385/17; 385/16
(58) Field of Search ..................................... 385/16–24

(56) References Cited

U.S. PATENT DOCUMENTS 5,841,917 A    11/1998  Jungerman et al. ........... 385/17
6,160,928 A  * 12/2000  Schroeder ..................... 385/18
6,198,856 B1 *  3/2001  Shroeder et al. .............. 385/17

* cited by examiner

*Primary Examiner*—Phan T. H. Palmer
(74) *Attorney, Agent, or Firm*—JDI Patent; Joshua D. Isenberg

(57) ABSTRACT

An optical crossbar switch having refractive or reflective components for equalizing beam spreading and diffraction in all the connections. The optical fibers or waveguides coupled to the switch are not staggered, but are parallel as in a conventional fiber array. The refractive component is disposed between the switch and the input optical fibers. Preferably, a similar refractive component is disposed between the output optical fibers and the switch. The refractive component can be a stairstep block made of glass, silicon or silica. Light from each input fiber travels through a well-defined thickness of the stairstep block. Since the block has a refractive index greater than the surrounding atmosphere, the wavelength in reduced within the block, and beam spreading and diffraction are reduced.

20 Claims, 8 Drawing Sheets

OPTICAL SWITCH HAVING EQUALIZED BEAM SPREADING IN ALL CONNECTIONS

FIELD OF THE INVENTION

The present invention relates generally to fiber optic silicon microbench devices and optical switches. More particularly, it relates to an apparatus having refractive and/or reflective components for equalizing optical pathlengths in a fiber optic switch.

BACKGROUND OF THE INVENTION

Fiber optic devices are commonly used for optical communications and optical computer networking. Optical data networks often have crossbar switches for switching optical connections between different fibers in two coupled fiber arrays.

FIG. 1 shows a typical silicon microbench crossbar switch 24 according to the prior art. Input optical fibers A–C 20 are coupled through GRIN lenses 22 to the switch 24. The switch 24 has pivotable micromechanical mirrors 26, 28 that can be in a horizontal position or a vertical position. Output fibers D–F 30 are coupled to GRIN lenses 32 and are aligned to receive light from vertical mirrors 26. Mirrors 26 are in a vertical position; mirrors 28 are in a horizontal position.

Mirrors 26 in the vertical position reflect light to the output fibers 30, Mirrors 28 in the horizontal position do not reflect light. Any input fiber A–C 20 can be coupled to any output fiber D–F 30 with appropriate control of the mirrors. One problem with the device of FIG. 1 is that different mirror configurations provide different optical path lengths between the input fibers and output fibers. For example, the connection between fibers B and D is shorter than the connection between fibers C and E. Therefore, as the switch connections change, the optical paths lengths change and the beam spreading characteristics change. This renders it impossible to optimize the focusing characteristics of the GRIN lenses for all possible connections. Another undesirable result is that the optical loss of the switch is different for different connections.

U.S. Pat. No. 5,841,917 discloses a crossbar switch that has input and output optical fibers arranged in a staggered fashion. The staggered fibers equalize the optical path lengths for all possible connections. A problem with this approach is it precludes the use of conventional, nonstaggered V-groove fiber arrays and monolithic microlens arrays. Staggered fiber arrays terminated with individual GRIN lenses tend to be more expensive and difficult to assemble than conventional V-groove fiber arrays that are coupled to monolithic microlens arrays.

There is a need for a fiber optic crossbar switch that has equalized effective optical path lengths for all connections, and is compatible with conventional, nonstaggered fiber array components.

OBJECTS AND ADVANTAGES OF THE INVENTION

Accordingly, it is a primary object of the present invention to provide a fiber optic crossbar switch that:

1) provides equalized beam spreading characteristics for all possible connections;
2) does not require that the optical fibers and lenses be arranged in a staggered fashion;
3) is compatible with conventional nonstaggered fiber arrays such a V-groove arrays and with monolithic microlens arrays.

These and other object's and advantages will be apparent upon reading the following description and accompanying drawings.

SUMMARY OF THE INVENTION

These objects and advantages are attained by the present apparatus for switching optical signals. The apparatus has an optical switch that utilizes reflective elements arranged such that different switching configurations create different optical paths between the input and output fibers. For example, the apparatus can have a crossbar switch with reflective elements arranged in at least two columns and two rows. There are at least two waveguides (e.g. optical fibers) directed toward the reflective elements. Finally, the apparatus has an input stairstep block disposed between the waveguides and the crossbar switch. Each waveguide is associated with a different optical path through the switch. The stairstep block is oriented so that the longest optical path through the stairstep block is associated with the longest optical path through the switch.

Preferably, the steps of the stairstep block have a length that is accurately sized in accordance with the spacing between reflective elements in the switch. The present invention provides equations for relating these distances and the refractive index of the stairstep block.

Preferably, the apparatus includes at least two output waveguides for receiving light transmitted by the input waveguides and reflected by the reflecting elements.

Also preferably, an output stairstep block is disposed between the output waveguides and the switch.

The stairstep blocks can have a rectangular shape, or a slanted shape.

The stairstep blocks can have beveled or anti-reflection coated endfaces to reduce backreflection into the optical waveguides.

Also, the stairstep blocks can have one less step than the number of waveguides. For example, if there are K input waveguides, then the input stairstep block can have K-1 steps.

The present invention includes embodiments having a prism instead of a stairstep block disposed between the waveguides and the switch.

The present invention also includes embodiments having a small prism or a small reflector associated with each waveguide, wherein the arrangement of the fiber arrays and prisms or reflectors provides equalized beam paths for all possible switching connections.

DETAILED DESCRIPTION

The present invention provides fiber optic crossbar switches with equalized optical path lengths between input fibers and output fibers. The optical fibers are not staggered. The present invention includes path-equalizing refractive and reflective components disposed between the switch and the fibers. One component is located between the input fibers and switch; one component is located between the output fibers and switch. The refractive component can be a stairstep block, or one or more triangular prisms. If a prism is used, the fibers should be disposed at a nonperpendicular angle with respect to the switch. The reflective component can be a series of mirrors that intercept individual optical beams emerging from the waveguides and direct them to the switching fabric.

Figure 1:
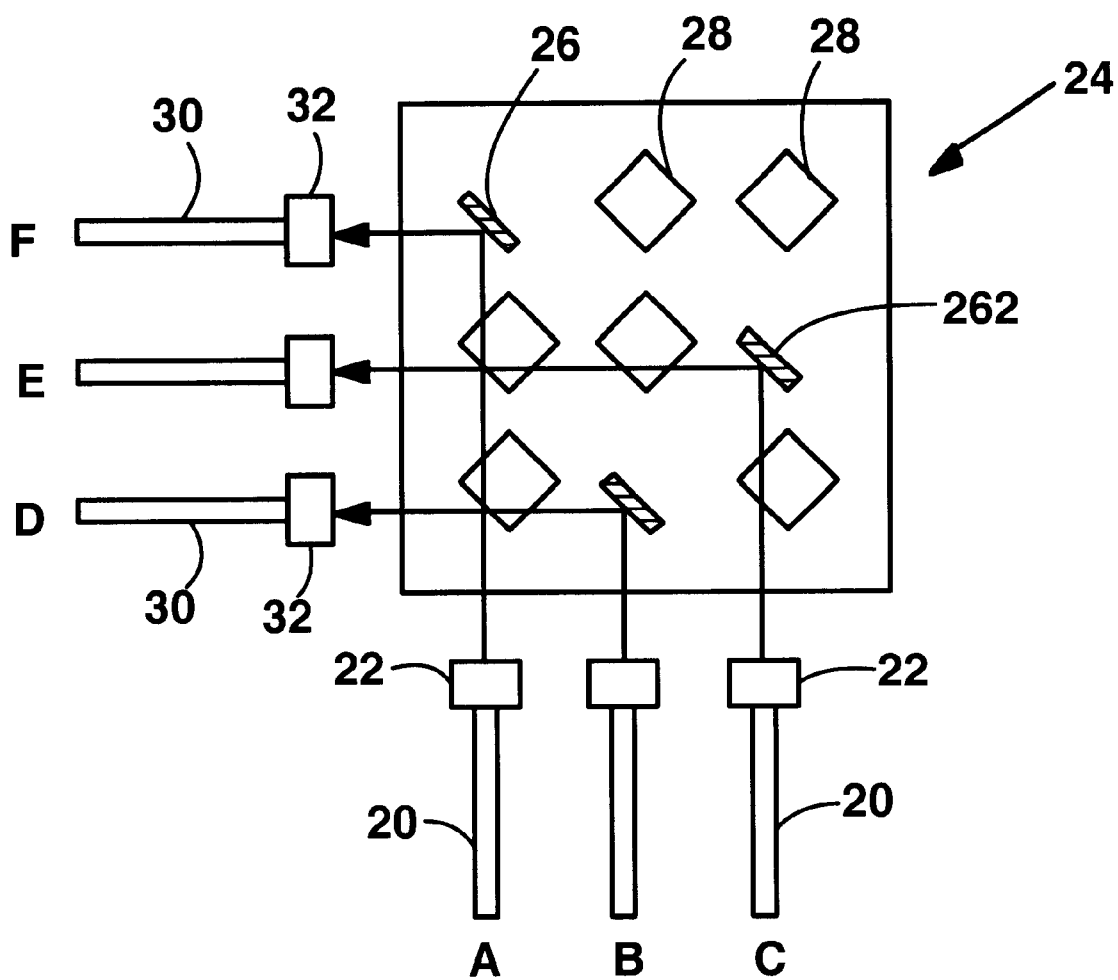
FIG. 1 (Prior Art) shows a conventional crossbar switch, illustrating how the optical path length depends upon switch connection.
Figures 2A, 3:
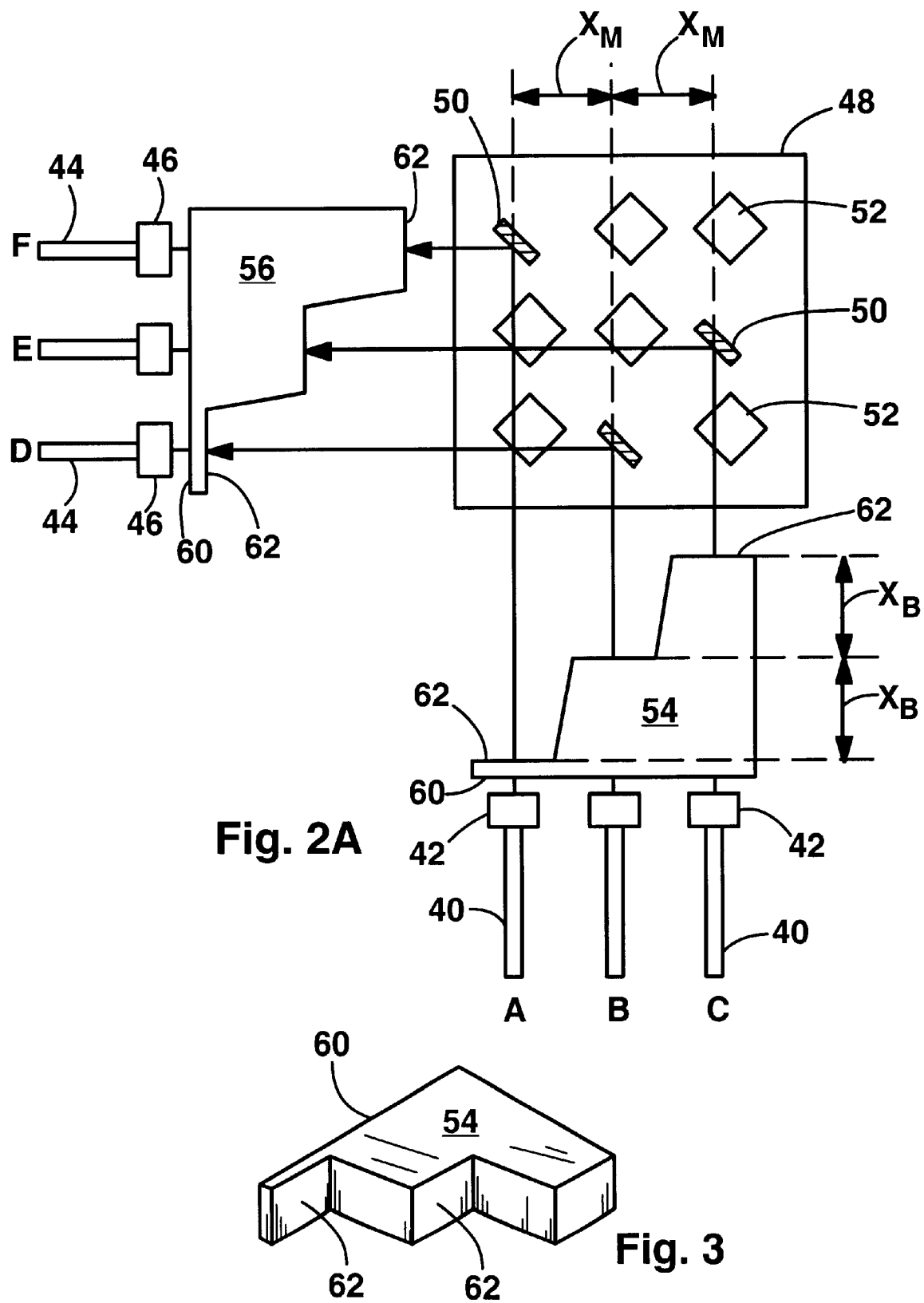
FIG. 2A shows a preferred embodiment of the present invention having stairstep blocks with the index of refraction higher than a surrounding environment.
FIG. 3 is a perspective view of the stairstep blocks in FIG. 2A–B.

FIG. 2A shows a top view of a preferred embodiment of the present invention. Input optical fibers A–C 40 are coupled to lenses 42. Output optical fibers D–F 44 are coupled to lenses 46. A 3×3 crossbar switch 48 is disposed to control connections between the input optical fibers 40 and the output optical fibers 44. The crossbar switch has mirrors in a vertical position 50 and mirrors in a horizontal position 52. The preferred embodiment has an input stairstep block 54 and an output stairstep block 56. The input stairstep block 54 is disposed between the input optical fibers 40 and the switch 48; the output stairstep block 56 is disposed between the output optical fibers 44 and the switch 48.

Of course, it is understood that mirrors 50, 52 can be replaced with any kind of controllable reflective element such as electrooptic devices.

Also, it is understood that although the present t invention is described as employing optical fibers, the optical fibers can be replaced with other types of waveguides including waveguides integrated into transparent substrates. Such waveguides are commonly used in integrated optical devices.

Also, it is understood that the lenses 42 can be an array of individually manufactured lenses such as graded refractive index (GRIN) lenses, ball lenses, microlenses etc., or a monolithic refractive or diffractive lens array.

Furthermore, it is understood that although the switch 48 is depicted as a 3×3 array of mirrors, the invention is equally applicable to other arrays such as N×N square arrays M×N rectangular arrays or 1XN linear arrays, where M and N are integers.

The stairstep blocks 54 56 are made of a material having a refractive index higher than the surrounding environment or atmosphere. High refractive index materials are preferred. Preferably the blocks are made of glass, fused silica, silicon (preferred for some applications due to its high refractive index) or similar transparent material.

Typically, the surrounding atmosphere is air with refractive index of 1. In the present application, the 'surrounding environment' refers to the areas where light propagates between the substrate containing;the mirror arrays and the fibers. The surrounding environment may comprise other materials such as liquids or gels in special applications.

Input faces 60 and step faces 62 preferably have antireflection coatings and are planar parallel.

FIG. 3 shows a perspective view of the stairstep blocks.

The beam spreading and diffraction characteristics of a light beam depend upon the refractive index of the material through which the light is traveling. A higher refractive index results in reduced beam spreading and diffraction per unit distance traveled. More specifically, beam spreading and diffraction change by a factor of n1/n2 when light travels from a material with index n1 to a material with index n2. This is because the wavelength is shortened by a high refractive index and short wavelengths experience less diffraction and beam spreading per unit distance traveled.

In the specific embodiment shown in FIG. 2A, the mirrors of the switch 48 are arranged in a square grid pattern. All the rows and columns of mirrors are separated by the spacing $X_M$. The step height of all steps of both blocks is $X_B$. The distances $X_B$ and $X_M$ are selected according to the equation:

$$X_M = \left(1 - \frac{n_0}{n_B}\right) X_B$$

where $n_0$ is the refractive index of the surrounding environment, and $n_B$ is the refractive index of the stairstep blocks. This condition provides that beam spreading and diffraction are the same for all possible optical paths through the switch. For most embodiments, $n_0$ is for air and is equal to 1. Henceforth it is assumed that $n_0=1$.

Figure 2B:
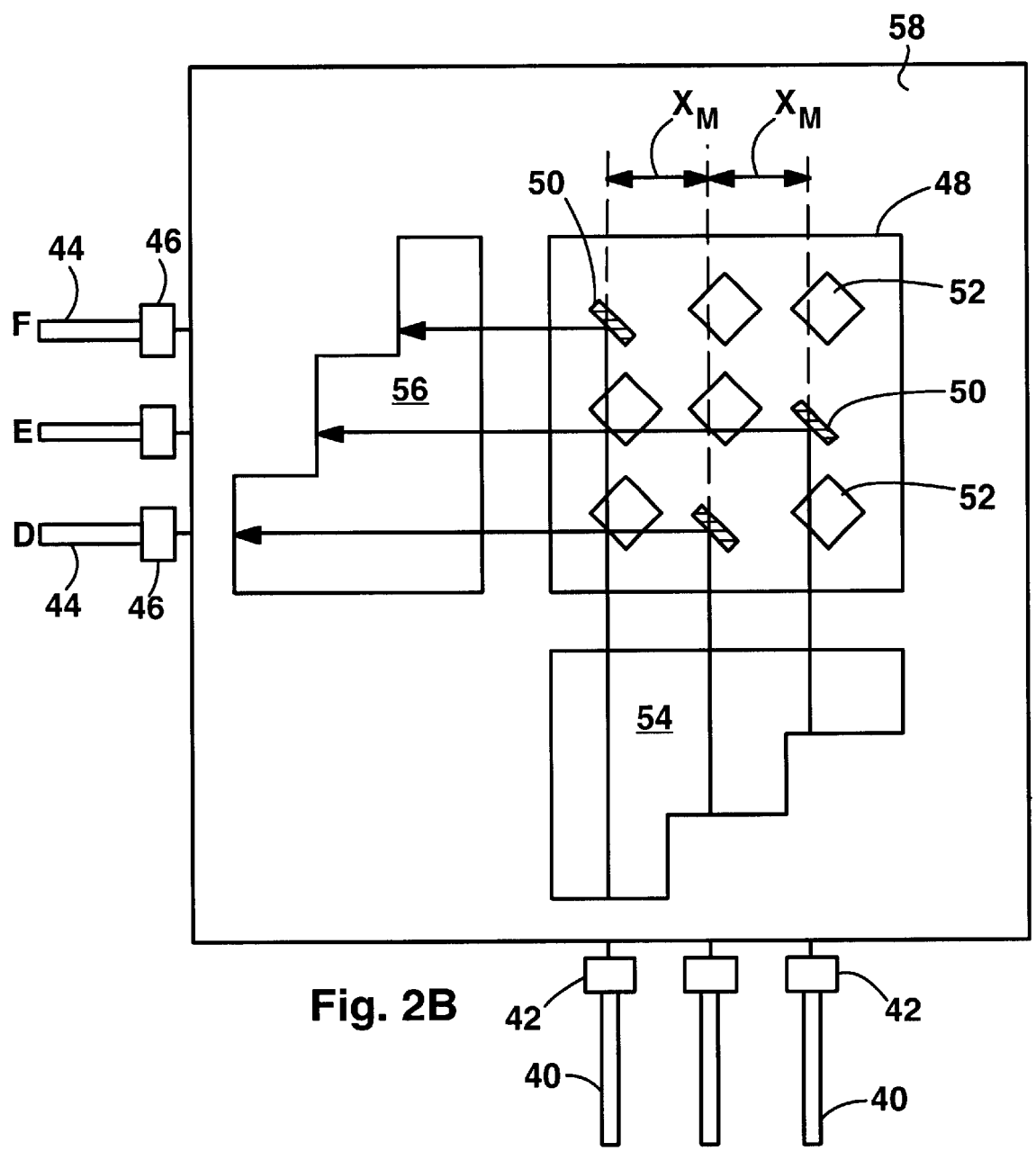
FIG. 2B shows an alternative embodiment of the present invention having stairstep blocks with the index of refraction lower than a surrounding environment.

FIG. 2B shows an alternative embodiment where the material comprising the region 58 between the switch 48 and the fiber arrays A–B 40 and D–F 44 has an index higher than that of air. The voids 54 and 56 in the region 58 perform the same function as the stairstep blocks as described in FIG. 2A. In FIG. 2B, the surrounding material 58 has a refractive index higher than air, and the "stairstep blocks" may comprise a series of voids 54 and 56 in that material 58. In this case, the voids 54 and 56 are designed so that the longest optical path through the switch is associated with the shortest optical path through a void, or the longest optical path through a region containing the high-index material. This configuration is equivalent to having a block identical to that shown in FIG. 2A.

Figure 4:
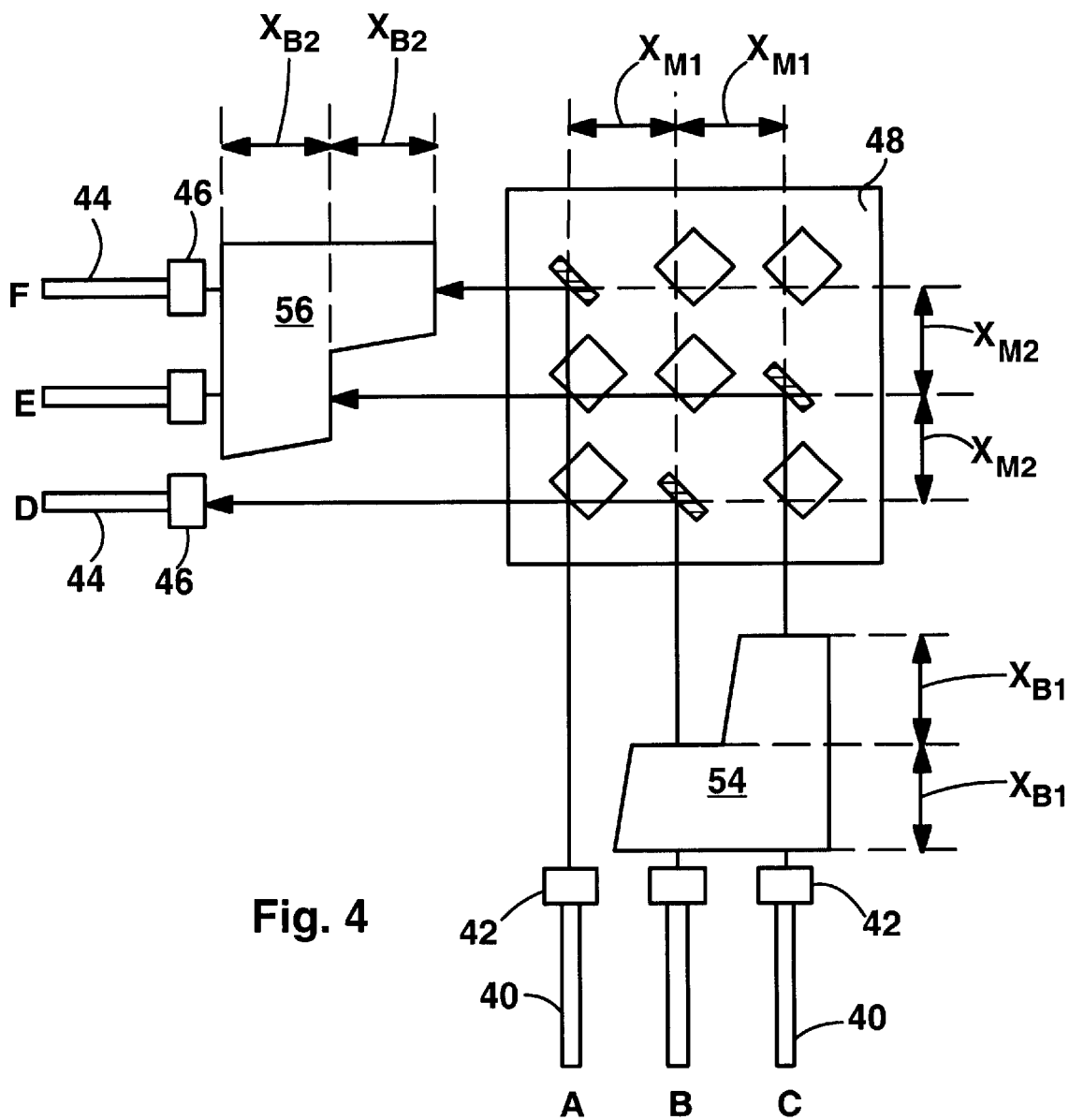
FIG. 4 shows an alternative embodiment of the invention and more specifically illustrates how the step lengths in the block and switch spacings are related.

FIG. 4 illustrates an alternative embodiment of the present invention and more clearly,shows how the stairstep blocks are designed. In this embodiment, the input and output stairstep blocks 54, 56 have only 2 steps, even though there are 3 input fibers A–C and 3 output fibers D–F. Fibers A and D are associated with the shortest optical paths through the switch and do not have an associated optical path through the stairstep blocks. In the present invention, the fibers associated with the shortest optical paths do not need be coupled with the stairstep blocks. More generally, if there are K fibers, then the associated stairstep block. only needs to have K-1 steps. It is noted, however, that for certain embodiments it may be preferred to have K steps so that all connections experience the same propagation conditions (e.g. transmission through an interface).

FIG. 4 also illustrates how to design a switch according to the present invention where spacing between columns is unequal to spacing between rows. In this case, the column spacing $X_{M1}$ is not equal to the row spacing $X_{M2}$. The column spacing $X_{M1}$ and the step is height $X_{B1}$ of the input stairstep block are related according to the equation:

$$X_{Mi} = \left(1 - \frac{1}{n_B}\right) X_{Bi}.$$

Similarly, The row spacing $X_{M2}$ and the step height $X_{B2}$ of the output stairstep block are related according to the equation:

$$X_{M2} = \left(1 - \frac{1}{n_B}\right) X_{B2}.$$

Therefore, when the row and column spacings are different, the steps $X_{B1}$ for the input block 54 are not equal to the steps $X_{B2}$ for the output block 56.

For nonuniform row spacings or column spacings (e.g., when not all rows have the same spacing, or not all columns have the same spacing), the steps of the stairstep blocks should be proportionate to the spacing of each associated row or column. In this case, therefore, a stairstep block will have unequal steps.

Figure 5:
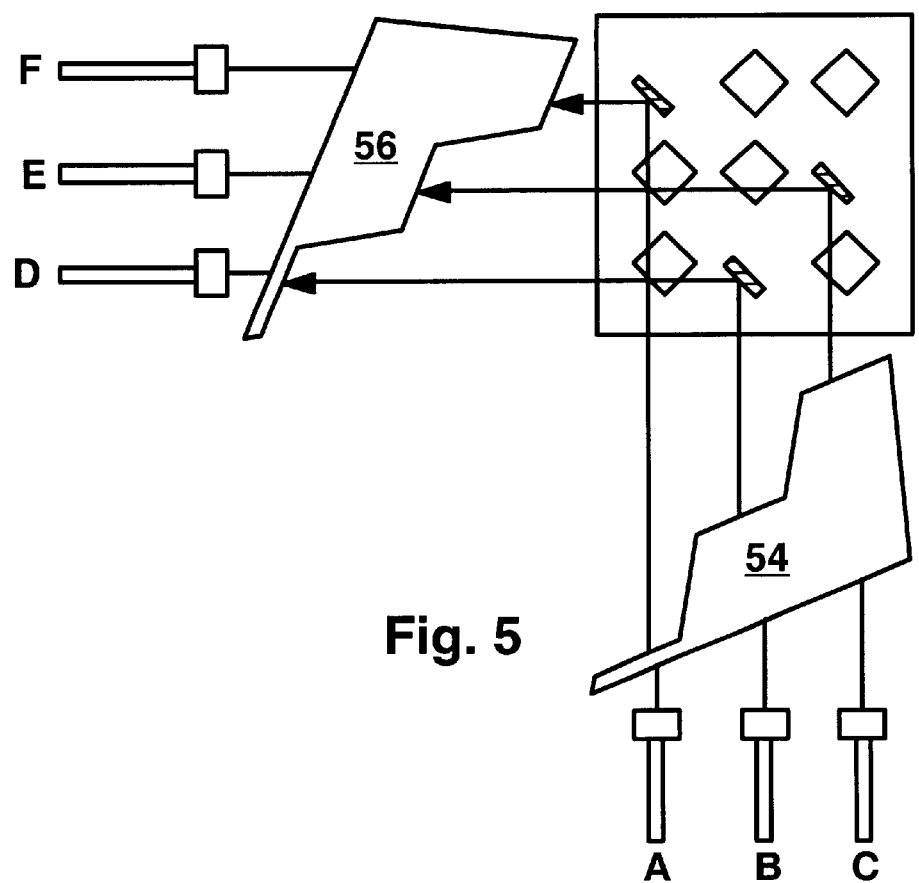
FIG. 5 shows an alternative embodiment where the stairstep block is slanted.

FIG. 5 shows yet another embodiment of the present invention where the input face 60 and the step faces 62 are slanted. Preferably, the input face 60 and the step faces 62 are parallel. In this embodiment, he spacing between the optical fibers is different from the spacing between the mirrors. This embodiment is not preferred because it requires nonuniform spacings between the fibers A–C and D–F. However, it may be beneficial to use a stairstep block with a very slight slant angle as this will reduce back reflections. Alternatively, a square stairstep block can be disposed at a slight angle with respect to the fibers, rows and columns of the device. In an alternative embodiment of the present invention where the faces of the stairstep blocks are beveled to reduce backreflection into the waveguides.

Figure 6:
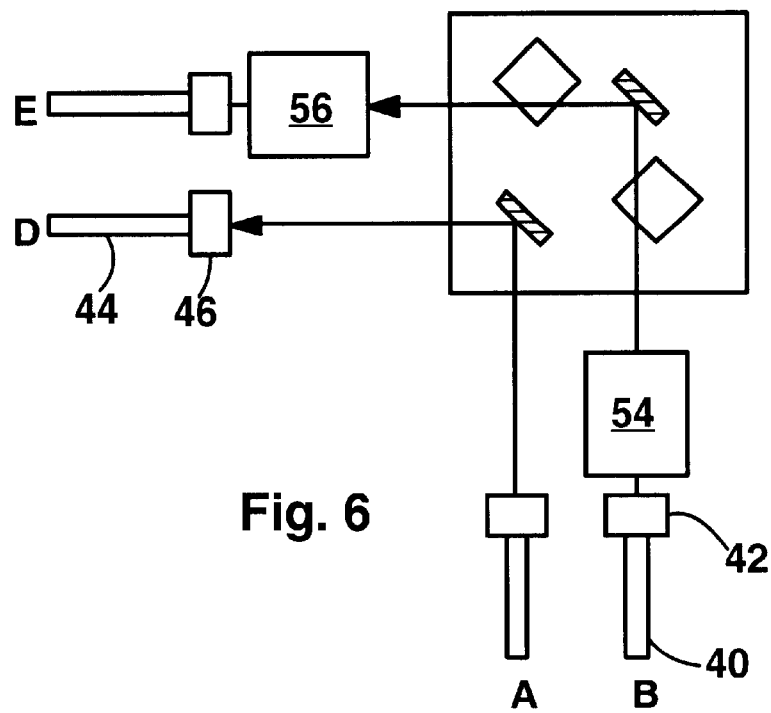
FIG. 6 shows a very simple embodiment of the present invention where the stairstep block has a single step.

FIG. 6 shows the simplest embodiment of the present invention in a 2×2 crossbar switch. The input and output stairstep blocks 54, 56 comprise a single block. Input fiber A and output fiber D do not need to be associated with an optical path through the stairstep blocks.

Figure 7A:
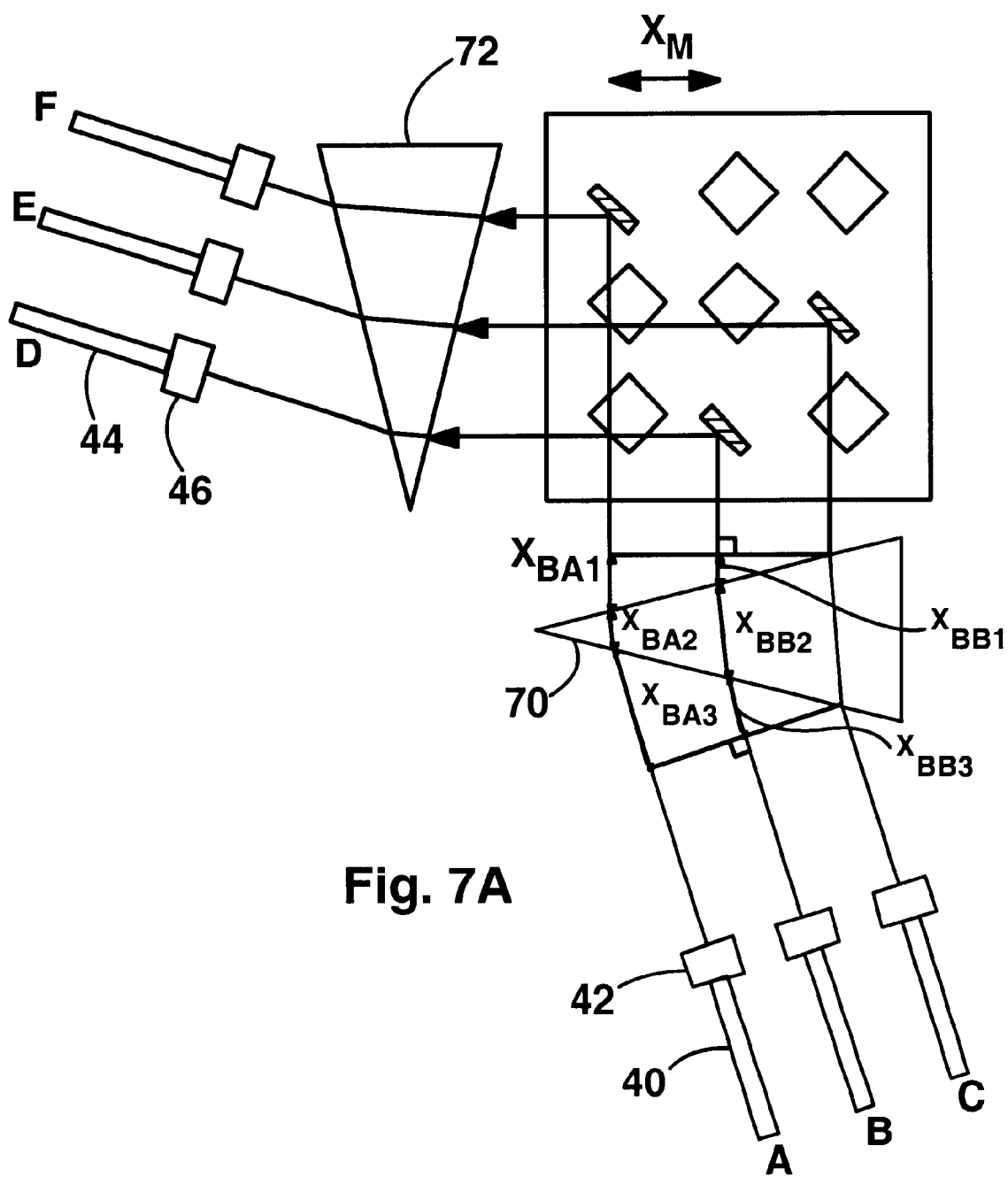
FIG. 7A shows an alternative embodiment having prisms instead of stairstep blocks. The prisms perform the same function as the stairstep blocks.

FIG. 7A shows an alternative embodiment having an input prism 70 and an output prism 72 instead of stairstep blocks. The prisms 70, 72 are oriented so that the wide ends are located in the light paths associated with the long optical paths through the switch. In the specific embodiment shown in FIG. 7A, the mirrors of the switch 48 are arranged in a square grid pattern. All the rows and columns of the mirrors are separated by a spacing $X_m$. The effective optical paths between the mirror array and fibers D and E are represented as $X_{BD}$ and $X_{BF}$, respectively, where:

$$X_{BD} = X_{BD1} + (n_0/n_B)X_{BD2} + X_{BD3}$$

$$X_{BE} = X_{BE1} + (n_0/n_B)X_{BE2} + X_{BE3}$$

where $n_0$ is the refractive index of the surrounding environment, $n_B$ is the refractive index of the prisms, and $X_{DB1}$, $X_{BD2}$, $X_{BD3}$, $X_{BE1}$, $X_{BE2}$ and $X_{BE3}$ are defined in FIG. 7A. To compensate for the difference of $X_m$ between the effective optical paths associated with fibers D and E, the following condition must be satisfied:

$$X_{BD} - X_{BE} = X_m$$

A similar condition may be applied to all other input and output channels. If the spacing between the mirror rows and columns is different, then a different set of condition applies for the input and output fibers.

Figure 7B:
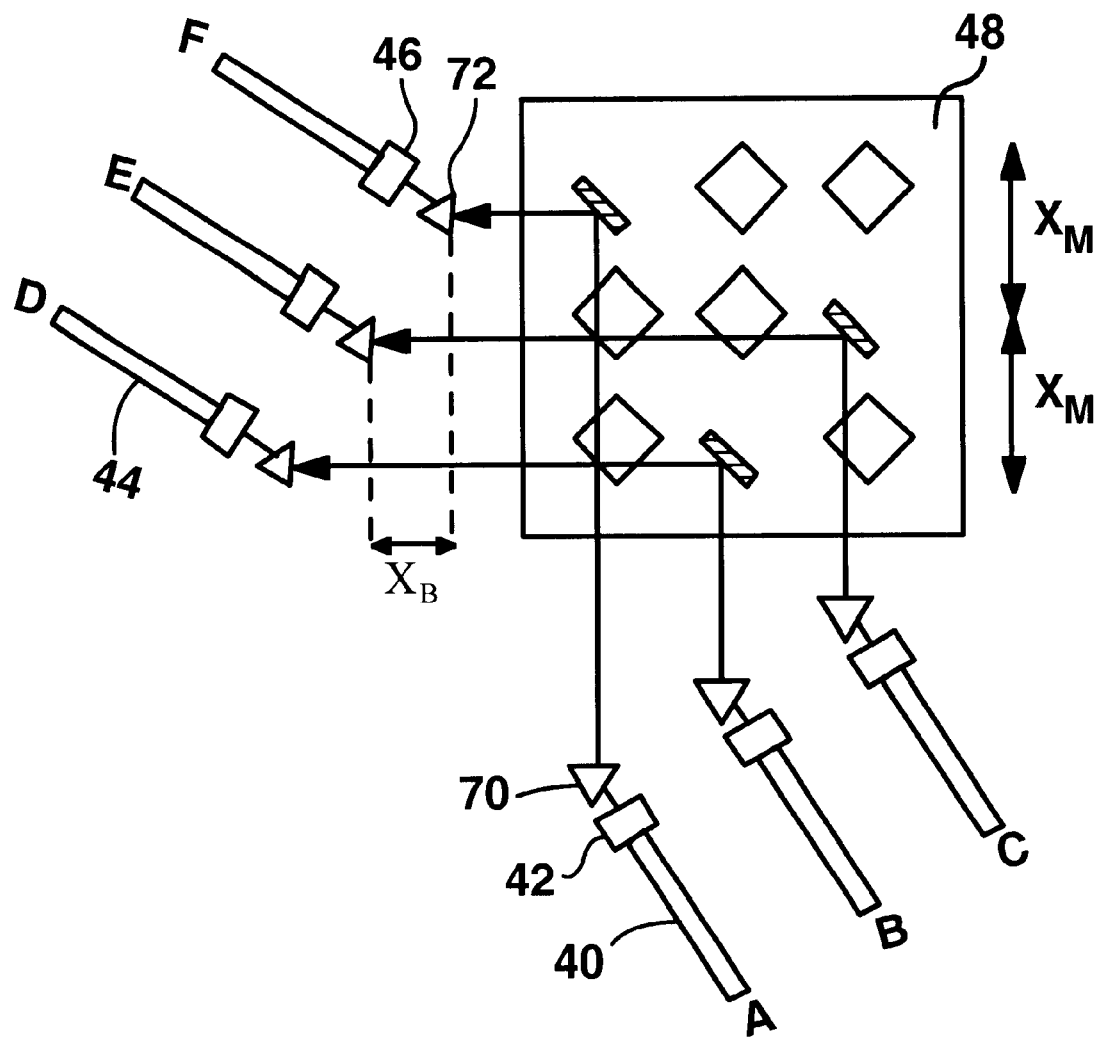
FIG. 7B shows an alternative embodiment having a series of small prisms used to individually deflect each optical beam, where the series of small prisms are arranged in a line perpendicular to the fiber arrays.

FIG. 7B shows an alternative embodiment having two series of small optical deflectors 70 and 72 used to individually deflect every optical beam. Each deflector can consist of a small prism, a small mirror, or a combination of mirrors and prisms. In the particular embodiment shown in FIG. 7B, the deflectors are small prisms. The purpose of the deflectors is to allow the beams emerging from the fiber arrays 40 and 44 to approach the mirror array 48 at a perpendicular angle even though the fiber arrays 40 and 44 are arranged at a nonperpendicular angle relative to the mirror array. Arranging the waveguide arrays 40 and 44 at a nonperpendicular angle relative to the mirror array 48 allows the effective optical pathlengths for different connections to be equalized.

In the particular implementation shown in FIG. 7B, the deflectors 70 and 72 are arranged in a line perpendicular to the fiber arrays A–C 40 and D–F 44. Each deflector 70 or 72 is associated with an input or output fiber. In the specific embodiment shown in FIG. 7B, the mirrors of the switch 48 are arranged in a square grid pattern. All the rows and columns of the mirror are separated by the spacing $X_m$. To equalized the optical paths, the deflectors must be arranged such that $$X_B = X_m$$

where $X_B$ is the difference in the path from adjacent waveguides to the edge of the mirror array, as shown in FIG. 7B.

Furthermore, appropriate choice of deflection angle and spacing $X_B$ allows fiber arrays 40 and 44 to be aligned parallel to each other.

Figure 7C:
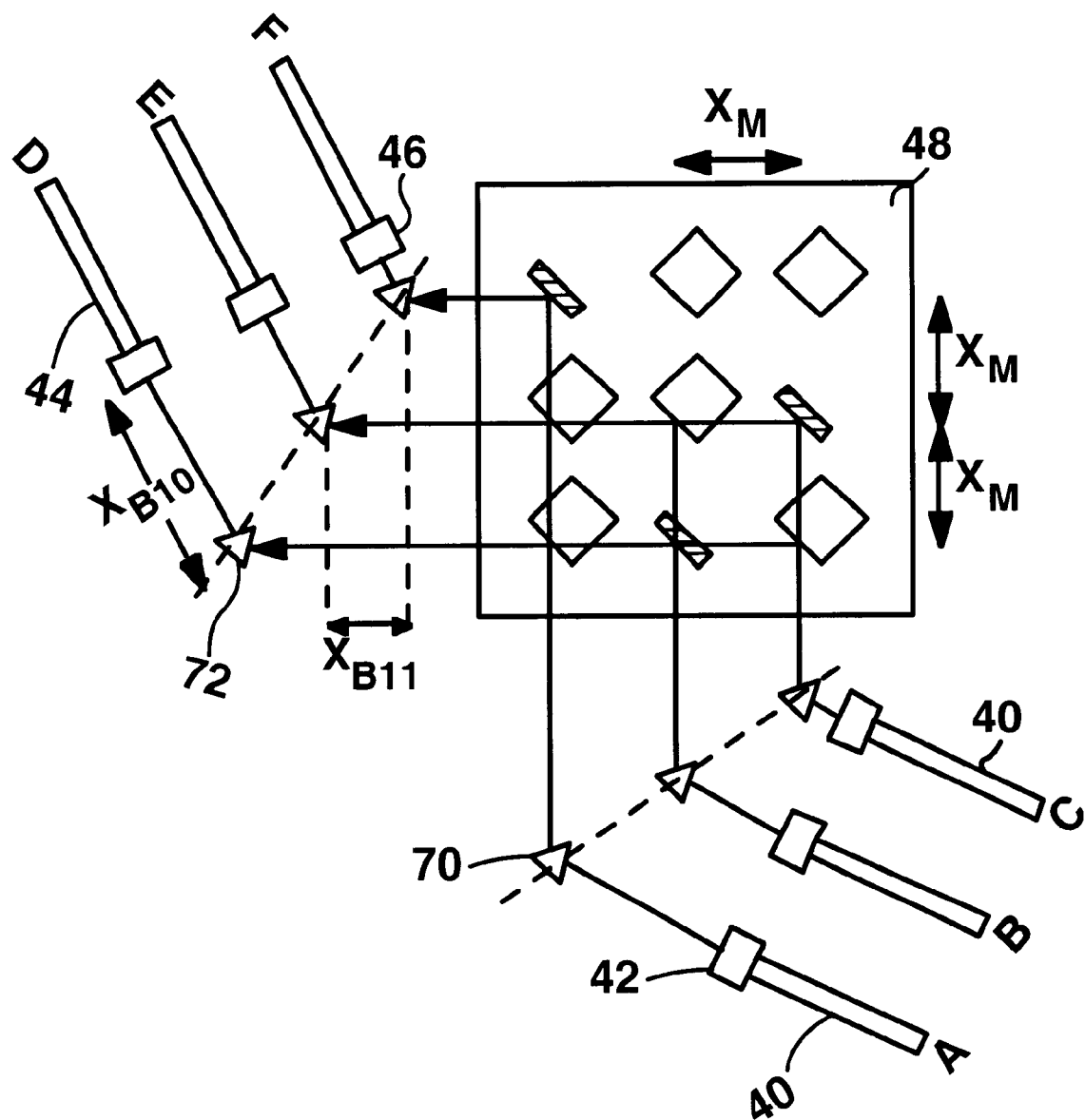
FIG. 7C shows another alternative embodiment having a series of small prisms used to individually deflect each optical beam, where the series of small prisms are arranged in a line not perpendicular to the fiber arrays.

In another particular implementation shown in FIG. 7C, the arrays of deflectors 70 and 72 is arranged at a nonperpendicular angle relative to the fiber arrays 40 and 44. In this case, the optical paths are equalized if the fiber arrays 40 and 44, the array of the deflectors 70 and 72, and the mirror arrays 48 area arranged such that the following condition is satisfied:

$$X_{B10} + X_{B11} = X_m$$

where $X_{B10}$ and $X_{B11}$ are the differences in the paths from the adjacent waveguides to their corresponding deflectors, and from those deflectors to the edge of the mirror array, respectively.

The series of deflectors in this implementation can consist of individually manufactured deflectors that are assembled on a common substrate, or, can comprise features fabricated in a single substrate. Alternatively, the deflectors 70 or 72 may be lenses that are slightly offset from the corresponding fibers. Such a configuration, which may be accomplished using one or more arrays of microlenses, simplifies the manufacturing process and reduces the number of components.

Although the. present invention has been mainly described as having two stairstep blocks, two prisms, or two sets of deflectors (mirrors or prisms), the invention includes a switch having a combination of the above, where one apparatus is employed on the input and another on the output. Also, a switch having a single stairstep block or a single prism is also within the scope of the present invention. For example, the present invention includes embodiments where a stairstep block is disposed in the input side of the switch, and no corresponding block or prism is disposed in the output side. Although this does not provides optimal performance, the performance is improved compared to a device not having any prism or block. Also, a device with only a single block or prism provides manufacturing advantages compared to prior art devices.

It is also noted that all embodiments of the present invention can be used with M×N switches where M≠N. In this case different stairstep blocks with different numbers of steps are used in the input and output sides. of the switch, or different prisms are used with different dimensions.

It is also noted that although certain components have been labeled as 'input' or 'output' components, the switch can operate in both directions. The 'input' and 'output' designations are provided for brevity and clarity. They do not necessarily impose limits on the functions of the components.

It will be clear to one skilled in the art that the above embodiment may be altered in many ways without departing from the scope of the invention. Accordingly, the scope of the invention should be determined by the following claims and their legal equivalents.

What is claimed is:

1. An apparatus for switching optical signals comprising:
   a) an optical crossbar switch having two or more reflective elements;
   b) at least two input waveguides directed toward the reflective elements;
   c) an input stairstep block disposed between the waveguides and the reflective elements and made of transparent material, wherein the input stairstep block has an input face and at least one step;
   wherein:
      i) each waveguide is associated with a distinct optical path through the input stairstep block;
      ii) each distinct optical path has a different length through the input stairstep block;
      iii) the input stairstep block has an index of refraction different from a surrounding environment.

2. The apparatus of claim 1 further comprising at least two output waveguides directed toward the reflective elements for receiving light incident on the reflective elements from the input waveguides.

3. The apparatus of claim 2, further comprising an output stairstep block, wherein the number of output waveguides is K, and the output stairstep block has K-1 steps so that light traveling to a single output waveguide associated with a shortest optical path through the switch does not pass through the output stairstep block.

4. The apparatus of claim 2 further comprising an output stairstep block disposed between the output waveguides and the reflective elements wherein:
   a) each waveguide is associated with a distinct optical path through the output stairstep block;
   b) each distinct optical path has a different length through the output stairstep block;
   c) long optical paths through the switch are associated with long optical paths through the output stairstep block; and
   d) the output stairstep block has an index of refraction different from a surrounding environment.

5. The apparatus of claim 2, further comprising an output stairstep block, wherein the output stairstep block has a step length of $X_{B2}$, and wherein a length $X_{M2}$ indicates an optical path difference between reflective elements associated with different output waveguides, wherein $X_{B2}$ and $X_{M2}$ are related by an expression substantially equivalent to:

$$X_{M2} = \left(1 - \frac{n_0}{n_B}\right) X_{B2}$$

where $n_0$ is a refractive index of the surrounding environment, and $n_B$ is a refractive index of the output stairstep block.

6. The apparatus of claim 1 wherein the input stairstep block has a step length of $X_{B1}$, and wherein a length $X_{M1}$ indicates an optical path difference between reflective elements associated with different input waveguides, wherein $X_{B1}$ and $X_{M1}$ are related by an expression substantially equivalent to:

$$X_{M1} = \left(1 - \frac{n_0}{n_B}\right) X_{B1}$$

where $n_0$ is a refractive index of the surrounding environment, and $n_B$ is a refractive index of the input stairstep block.

7. The apparatus of claim 1 wherein the input stairstep block has a rectangular shape and the input waveguides are perpendicular to the input face.

8. The apparatus of claim 1 wherein the input stairstep block has a slanted shape and the input waveguides are not perpendicular to the input face.

9. The apparatus of claim 1 wherein the number of input waveguides is K, and the input stairstep block has K-1 steps so that light from a single input waveguide associated with a shortest optical path through the switch does not pass through the input stairstep block.

10. An apparatus for switching optical signals comprising:
    a) an optical crossbar switch having two or more reflective elements;
    b) at least two input waveguides in optical communication with the reflective elements;
    c) an input prism disposed between the waveguides and the reflective elements and made of transparent material, and having an input face and an output face;
    wherein:
       i) each waveguide is associated with a distinct optical path through the input prism;
       ii) each distinct optical path has a different length through the input prism;
       iii) long optical paths through the switch are associated with long optical paths through the input prism; and
       iv) the input prism has an index of refraction different from that of a surrounding environment.

11. The apparatus of claim 10 wherein the input prism comprises a series of at least two small beam deflectors used to individually deflect each optical beam.

12. The apparatus of claim 11 wherein the small beam deflectors are small prisms.

13. The apparatus of claim 11 wherein the series of at least two small beam deflectors are arranged in a line perpendicular to the fiber arrays.

14. The apparatus of claim 11 wherein the series of at least two small beam deflectors are arranged in a line not perpendicular to the fiber arrays.

15. The apparatus of claim 10 further comprising at least two output waveguides directed toward the reflective elements for receiving light incident on the reflective elements from the input waveguides.

16. The apparatus of claim 15 further comprising an output prism disposed between the output waveguides and the reflective elements wherein:

a) each waveguide is associated with a distinct optical path through the output prism;
b) each distinct optical path has a different length through the output prism;
c) long optical paths through the switch are associated with long optical paths through the output prism; and
d) the output prism has an index of refraction higher than a surrounding environment.

17. The apparatus of claim 16 wherein the output prism comprises a at least small beam deflectors configured to individually deflect each optical beam.

18. The apparatus of claim 17 wherein the series of at least two small prisms are arranged in a line not perpendicular to the fiber array.

19. The apparatus of claim 17 wherein the series of at least two small prisms are arranged in a line perpendicular to the fiber arrays.

20. The apparatus of claim 16 wherein the small beam deflectors are small prisms.

* * * * *